Patented June 17, 1952

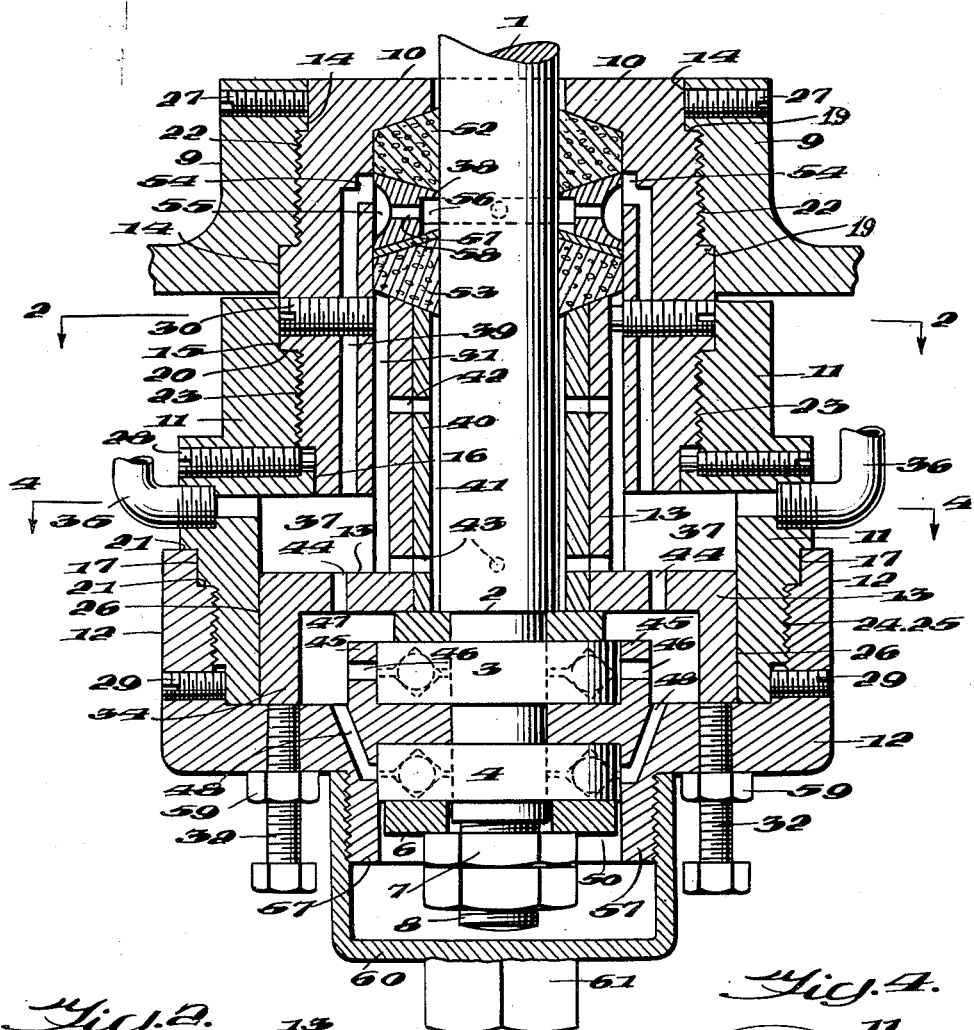

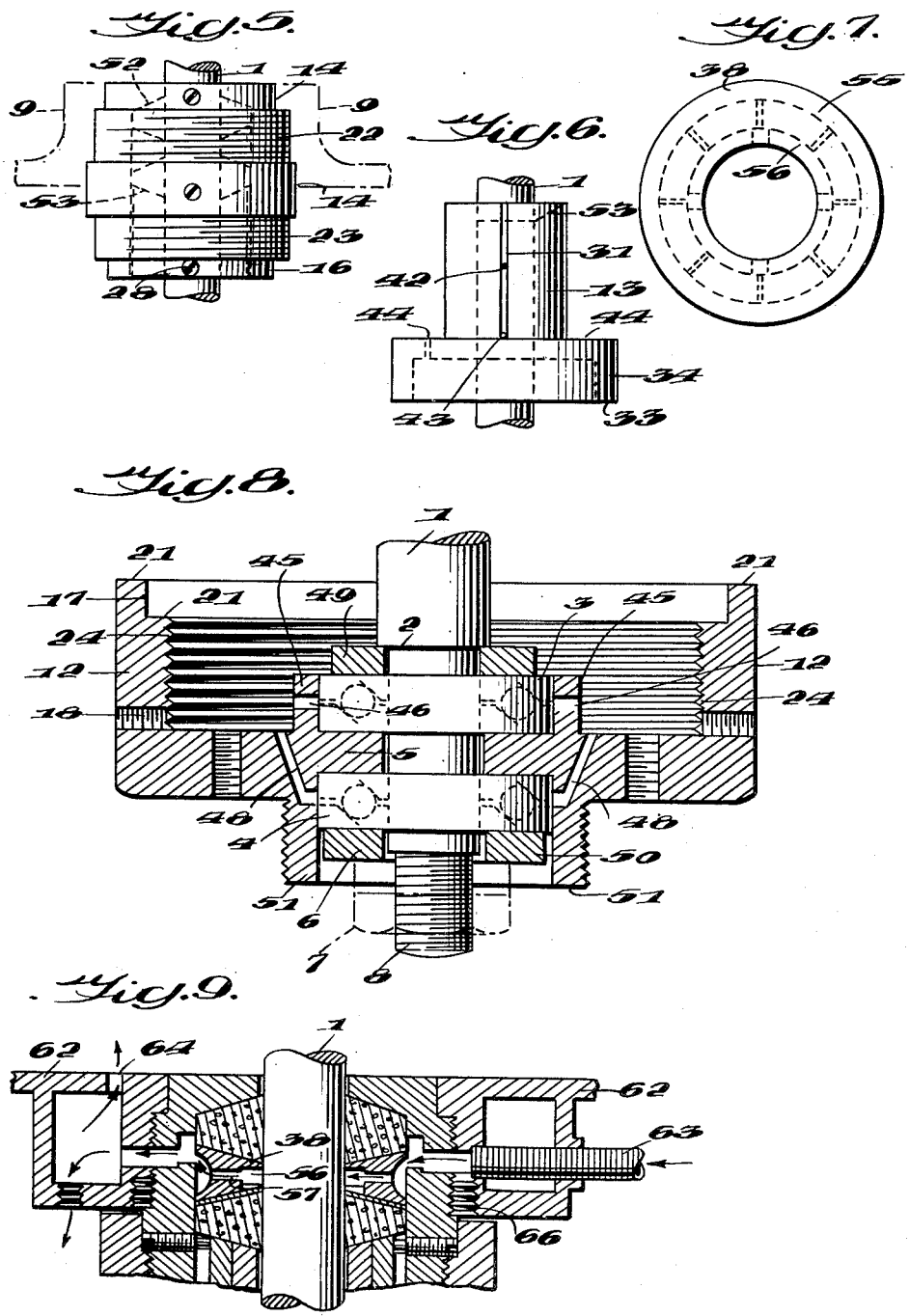

2,600,687

UNITED STATES PATENT OFFICE 2,600,687

THRUST BEARING

Eric A. F. Presser, East Chicago, Ind.

Application July 18, 1946, Serial No. 684,418

4 Claims. (Cl. 308—227)

My invention relates to improvements in thrust bearings, and it consists of the parts described and claimed in the specification.

The purpose of my invention is to provide a double acting thrust bearing; that has a stuffing box independent of the bearing; that uses forced lubrication to the stuffing box; that uses separate downward and upper thrust ball bearings; that adapts locking means for preventing the rotation of the interrelated parts as the shaft rotates; that provides forced lubrication to the ball bearings; and that provides an external adjustment of the gland used to compress the packing in the stuffing box. In addition, the invention is universally adaptable for the control of end thrusts in the shaft in either direction lengthwise of the shaft whether the shaft is used for rotating centrifugal or other types of liquid moving pumps. And that combines a stuffing box, a journal bearing and two end thrust ball bearings.

With these and other related ends in view I illustrate in the accompanying drawings such instances of adaptation as will show the broad underlying features without limiting myself to the specific details shown thereon and described herein.

Fig. 1 is an enlarged elevation in section of the assembled parts.

Fig. 2 is a reduced size top plan in section on line 2—2 of Fig. 1.

Fig. 3 is a reduced size top plan in section of the central portion of Fig. 2 through chamber 37.

Fig. 4 is a reduced size top plan in section on line 4—4 of Fig. 1.

Fig. 5 is a reduced size detached side elevation of the stuffing box portion.

Fig. 6 is a reduced size side elevation of the stuffing box gland.

Fig. 7 is a plan view of the spacer ring.

Fig. 8 is a detached elevation in section of the lower portion of Fig. 1.

Fig. 9 is an elevation in section of a circulating heat exchanger.

In commercializing my invention, I may use whatever modifications of structure that the exigencies of varying conditions may demand without departing from the broad spirit of the invention.

A very important feature of my invention is the maintaining of the axial alignment of all the parts without placing any dependence on the interthreaded portion between the parts. At the same time, dependence is placed in interengaging shoulders, for maintaining the axial spaced relation of the different parts and providing for forced lubrication.

The invention is associated with a revolving shaft 1 which may be subjected to endwise stresses whether the shaft is used to drive a centrifugal pump or any other piece of machinery in which the driving or driven shaft is subject to end stresses and it is rotated. The shaft has a shoulder 2 that serves as a stop for the downward stresses. These stresses are also carried by the ball bearing 3.

The upward stresses are met by the ball bearing 4. Both ball bearings 3 and 4 are seated, one above the ledge 5 or the part 12, and the other beneath it as shown in Fig. 1 and 8. There is an upward thrust collar 6 that rests against the ball bearing 4. A lock nut 7 is threaded onto the lower end 8 of the shaft 1. This nut engages the collar 6. It insures that the stationary race of the bearing 4 is clamped tightly against the seat 5. The upward end thrust of the shaft, or rather its upward stresses are carried by a series of shoulders, 19, 20, and 21, that interact with each other.

There is a housing 9 which may form a part of a pump frame or other device in which a rotating shaft is supported. Threaded into the housing 9 there is a stuffing box member 10. Threaded to the part 10 there is sleeve 11 which in turn is threaded into the downward and upper thrust member 12. This member supports the ball bearings 3 and 4. The inside of the sleeve 11 at its lower end has an aligning axial surface 26 against which the enlarged end 34, of the gland 13 slides, as the gland 13 is adjusted to take up wear of the stuffing packings 52 and 53.

The concentric aligning features comprise cylindrical inner-threaded surfaces 14, between the parts 9 and 10; the surfaces 15 and 16 between the parts 10 and 11; and the faces 17 and 18 between the parts 11 and 12. The end stresses are carried by the shoulders 19 between the parts 9 and 10; shoulders 20 between the parts 10 and 11; and shoulders 21 between parts 11 and 12.

The threaded portions of the cylindrical members 10, 11, and 12, are 22 between the parts 9 and 10; 23 between the parts 10 and 11; and 24, 25 between the parts 11 and 12.

The parts 10, 11, and 12 are kept from turning as the shaft 1 rotates, by set screws. In part 9 by the screw 27 which abuts the part 10; 28 in part 11 engaging the part 10; 29 in the part 12 holding the part 11 against the surface 18; 30 in the part 10 adapted to enter the axial slot 31 in the gland 13. The lower edge 33 of the gland 13 rests on three adjusting screws 32. The gland has the enlarged diameter 34 which engages the inner surface 26 of the lower portion of the part 11. This surface also forms the outer wall of the oil chamber 37. That is supplied with oil under any desired pressure through the entrance 35 to the different oil ducts and the outlet 36.

Oil from the chamber 37 may flow through the ducts 39 into the extension 54 to supply the spacer ring 38 under different adjustments of the ring. This ring divides the packing space into two parts, 52 and 53. The end wall of the packing space 52 in the part 10, is beveled and so is the end of the gland 13. The spacer ring is beveled in opposite directions so as to assist in compressing the packings 52 and 53 when the gland is adjusted by screws 32. The ring has an external groove 55 and an inner groove 56. The two annular grooves are connected at desired points by openings 57. The one wall of the inner groove 56 is cut away (Fig. 7) to permit the introduction of a pull out hook (not shown) when the packing is to be changed. The spacer ring is made the subject of a separate application, Serial No. 666,591, filed May 2, 1946 now abandoned. The ring has a washer 58 for closing the notches in the one wall of the groove 56, after repacking has been done.

The bearing proper is formed by a sleeve or bushing 40 that is pressed into the inside of the gland 13. The bushing 40 has several oil passages 41 next to the shaft 1. There are oil ducts 42, 43 from the ducts 31 to 41 to oil the shaft. Other oil ducts 44 are formed in the gland 13 from the oil chamber 37 into the oil space 47 to supply the oil holes 46 leading to the ball bearings 3 seated between the projections 45. Oil ducts 48 lead from the oil space 47 to the ball bearing 4.

A washer 49 is placed between the shaft shoulder 2 and the ball bearing 3. A similar washer 50 is placed below the ball bearing 4 and the lock nuts 7. The part 12 has a lower extension flange 51 to which is threaded the enclosing cap 60. Lock nut 61 is formed on the cap 60 to assist in removing the cap and in replacing it.

In the event that a stuffing box through an overload or other cause develops excessive temperature I provide a water jacket shown in Fig. 9. The water jacket cooperates through a bypass to form a water seal in the stuffing box packing which is permissible in all cases except when for instance an inflammable liquid is being handled. The lubricating feature of my stuffing box assembly in the absence of a water seal prevents the stuffing box running dry. The water jacket 62 is a part of the pump housing that takes the place of the part 9, Fig. 1. It has a vent 64, a bypass tube 63, a threaded outlet 65 and a locking screw 66 that holds the parts from turning as the shaft rotates.

The water seal is accomplished by means of the tube 63 which bypasses the water jacket 62. Water under pressure from the discharge chamber of the water pump (not shown) produces circulation through the spacer ring to form the water seal.

The entire assembly includes the stuffing box, the slidable bearing 40, and the ball bearings 3 and 4 that sustain the end stresses of the shaft 1. This unitary combination does away with the necessity of frequently repriming the water lines connected to the pump connected to the shaft.

At the point where the shaft of a water pump leaves the pump casing there is usually a water seal of the gland that serves the stuffing box. To provide this connection pumps have a small connection from the discharge chamber to the gland to keep it under water seal at all times. Not much pressure is required to supply the small amount of water that is needed. The two services, a water jacket and the forced circulation of a small amount of water through the spacer ring is distinctly separate from the water jacket except at the exhaust after the spacer ring has been supplied.

The adjustment of the gland 13 is very easily effected by the three external adjusting screws 32 (Fig. 1). After an adjustment has been made the screws 32 are held in place by lock nuts 59.

In the ordinary practice with water seals of stuffing boxes it is found that when the pump is stopped the water seal is broken and it will not restart unless it is reprimed because of the atmospheric air conditions around the gland portion of the box. In my arrangement of parts this is avoided because the stuffing box is remote from any outside atmospheric conditions. In consequence the structure is fool proof in that the seal is not lost.

The operation of my invention is divisable into three inter-related steps, viz: (a) independent adjustment of the stuffing box. (b) adjusting the ball bearings to take up slack caused by wear. (c) adjusting the shaft either backward or forward and in a rotary manner. These steps in their combined relation adapt the invention to a permanent maintenance of the axial alignment of all the parts whether they are used for one industrial purpose or another on centrifugal pumps, steam turbines, machine tools, etc. wherever a moving shaft is desired or required.

All the functions mentioned may be carried out independently of each other, so that the adjustment of one thing does not upset or conflict with the adjustment of any other thing. Referring specifically to the different parts of the invention, a gap is left between the parts 11 and 12 so that the shoulder 21 of the part 12 does not tightly engage the shoulder of the part 11. The threads 24 and 25 respectively of the parts 11 and 12 carry the end thrust stresses of the shaft in either direction. The stuffing box is adjusted entirely independently of the other steps or it may be changed at the same time. This is done by loosening the lock nuts 59 and adjusting the bolts 32 against the part 13. When it is necessary to take up any wear of the ball bearings the cap 6 is unscrewed and the parts 29, 59, and 32 are loosened, then the part 12 with its inside abutment 5 is advanced on the threads 24, 25, toward the part 11 which tightens the ball bearing 3 because the abutment or ledge 5 presses the bearing against the collar 49 and the shoulder 2 of the shaft 1. Thereafter the nuts 7 are loosened on the threaded end 8 of the shaft 1 and they are moved upward against the collar 6. This presses the bearing 4 against the abutment 5 of the part 12 which takes out any slack that may have accumulated in the bearings through any wear that has occurred in the balls and their races. This is completed by tightening the parts 29, 32, and 59, a replacement of the cap 60 completes the operation. Every step has been done without having moved the shaft and without defacing it in any way.

In order that the shaft may be adjusted lengthwise the parts 29, 32, and 59 are loosened in their seats and the part 12 is screwed back and forth around the part 11 on the threads 24, and 25 according to the desired endwise change in position of the shaft. These adjustments include the entire shaft and the whole thrust bearing assembly, but do not affect the gland 13 with its journal bearing 40. As a last step the parts 29, 32, and 59 are set tight in their respective seats and the entire operation is completed.

What I claim is:

1. A thrust bearing assembly that comprises a rotating shaft, a supporting housing, a stuffing box enclosing the shaft, a pair of ball bearings on the shaft to counteract the end stresses to which the shaft may be subjected, a casing for the parts, a single gland for the stuffing box, means for adjusting the gland exterior of the casing, an oil chamber encircling the gland, and oil ducts from the chamber to the stuffing box and separately to the ball bearings.

2. A detachable and inter-changeable double bearing unit, means for positioning the said unit on a rotating shaft for lengthwise adjustment thereon, ball bearings, a thrust bearing assembly associated with the ball bearing unit, adapted for minute precision adjustments of the shaft, a housing for supporting all the parts, means for adjusting the ball bearings exterior of the housing, a stuffing box, a journal associated with the stuffing box, and means for adjusting the stuffing box thereon exterior of the housing.

3. A thrust bearing assembly that comprises a rotating and axially displaceable shaft, a supporting housing, a stuffing box enclosing the shaft, a pair of ball bearings on the shaft to counteract the end stresses to which the shaft may be subjected, a casing for the parts, a single gland for the stuffing box, means for adjusting the glands exterior of the casing, an oil chamber encircling the gland, and oil ducts from the chamber to the stuffing box and separately to the ball bearings.

4. A thrust bearing assembly that comprises a rotating and axially displaceable shaft, a supporting housing, a stuffing box enclosing the shaft, a pair of ball bearings on the shaft to counteract the end stresses to which the shaft may be subjected, a thrust member for receiving the end thrust of the shaft in either direction, means for adjusting the axial position of the shaft while serving as a casing for the parts, a single gland for the stuffing box, means for adjusting the gland exterior of the casing, an oil chamber encircling the gland, and oil ducts from the chamber to the stuffing box and separately to the ball bearings.

ERIC A. F. PRESSER.

REFERENCES CITED

The following references are of record in the file of this patent:

UNITED STATES PATENTS

| Number | Name | Date |
| --- | --- | --- |
| 932,984 | Hale | Aug. 31, 1909 |
| 1,629,650 | Brauer | May 24, 1927 |
| 1,703,823 | Johansen | Feb. 26, 1929 |
| 1,817,867 | Bailey | Aug. 4, 1931 |
| 1,899,848 | Browne | Feb. 28, 1933 |
| 1,946,439 | Heller | Feb. 6, 1934 |
| 2,374,960 | Russell | May 1, 1945 |
| 2,453,182 | Bechler | Nov. 9, 1948 |